2,960,519
PROCESS FOR THE OXIDATION OF PARAFFIN WAX WHEREBY A HIGH SAPONIFICATION NUMBER PRODUCT IS OBTAINED BY USE OF A SILICONE

Ronald L. Marr, New Kensington, and Charles M. Selwitz, Pitcairn, Pa., assignors to Gulf Research & Development Company, Pittsburgh, Pa., a corporation of Delaware No Drawing. Filed Aug. 18, 1958, Ser. No. 755,424

10 Claims. (Cl. 260—451)

This invention relates to a process for oxidizing hydrocarbons and particularly to a process for oxidizing hydrocarbons wherein oxygen utilization is facilitated.

Hydrocarbons, such as paraffinic hydrocarbons, can be oxidized with oxygen to obtain a mixture comprising oxygen-containing compounds such as monobasic acids and dibasic acids. In order to facilitate oxidation of the hydrocarbon with oxygen, the hydrocarbon is maintained in a molten state and is agitated while a gas containing molecular oxygen is passed therethrough. While such procedure would apparently facilitate intimate contact between the hydrocarbon and the gas, foaming takes place and the utilization of oxygen during the reaction is thereby inhibited. As a result thereof, an oxidation product having a low saponification number is obtained. If under such circumstances oxidation is continued in order to obtain an oxidation product having a high saponification number a dark product containing resinification, decomposition and degradation products is obtained.

We have found that the above difficulties can be avoided and that oxygen utilization can be facilitated to obtain an oxidation product having a high saponification number by a process which comprises incorporating in the hydrocarbon a controlled amount of a silicone prior to subjecting said hydrocarbon to the action of a gas containing molecular oxygen.

As charge stock for the process of this invention, highly paraffinic hydrocarbons are preferred. Thus paraffin waxes with 20 to 40 carbon atoms and having a melting point of about 35° to about 75° C. are especially preferred. Also included are hydrocarbons such as paraffinic gas oil fractions, paraffinic scale waxes, foots oil, etc.

The amount of oxygen employed in the reaction can vary over a wide range, depending upon the remaining variables involved, but should be at least about 0.2, preferably about 0.4 to about 0.8 gram of oxygen per gram of hydrocarbon per hour. While oxygen is preferred, we can also use other gases containing molecular oxygen such as air or oxygen-enriched air.

In order to obtain the desired oxidation, temperature and pressure are important. The temperature of reaction can be about 120° to about 200° C., but preferably is about 150° to about 170° C. Pressures can be about one to about 250, but preferably about 10 to about 20, pounds per square inch absolute.

Since it is desired to oxidize the hydrocarbon with oxygen to obtain a product having a high saponification number, on the order of at least about 400, but preferably about 450 to about 600, the length of reaction time is extremely important. Thus a period of at least about one, but preferably about 4 to about 20 hours, is satisfactory.

As stated in order to obtain intimate contact between the hydrocarbon charge and the oxygen, the former is maintained in a molten state and is agitated, for example, by stirring with a mixer operating at the rate of at least about 1000 revolutions per minute, but preferably about 5000 to about 20,000 revolutions per minute, while oxygen is passed therethrough, continuously or intermittently.

However, under the reaction conditions set forth above, foaming of the hydrocarbon occurs, and the oxygen which is passed through the molten charge is not completely utilized. The result is that an oxidation product having a low saponification number is therefore obtained. As set forth above, the improvement herein lies in incorporating in the hydrocarbon charge, prior to oxidation, a controlled amount of a silicone. While any silicone can be employed preferred results are obtained using silicones having the following structural formula:

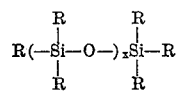

wherein R is an alkyl group having from one to 6 carbon atoms in the molecule, such as methyl, ethyl, isopropyl, secondary butyl, n-hexyl, etc., or an aromatic group having from 6 to 10 carbon atoms in the molecule, such as phenyl, tolyl, naphthyl, etc., and $x$ is an integer of about 100 to 1000.

Examples of silicones which can be used are dimethylpolysiloxane, diethylpolysiloxane, diphenylsiloxane, etc. While even small amounts of silicone can be used and improved results will be obtained, we prefer to employ at least about 0.01, but preferably about 0.02 to about 0.10, percent by weight of silicone based on the hydrocarbon charge.

Oxidation catalysts, such as manganese naphthenate, about 0.1 to about 2 percent by weight based on the hydrocarbon charge, can be employed if desired. In order to cut down on the induction period, about 2 to about 15 percent by weight, based upon the hydrocarbon charge, of an anhydride such as acetic, valeric, phthallic, succinic, benzoic, acetic butyric anhydride, valeric benzoic anhydride, eicosanoic anhydride, etc., or an oxidized product of a hydrocarbon such as the hydrocarbon defined herein, having a saponification number of about 200 to about 600, can be employed.

The oxidation product obtained herein contains dibasic acids such as succinic, gultaric, adipic, pimelic, sebacic, ketosebasic, etc.; monobasic acids such as formic, acetic, propionic, butyric, heptanoic, decanoic, etc.; aldehyde acids such as glutaric aldehyde acid, succinic aldehyde acid, etc.; aldehyde acid polymers; hydroxy acids and their esters, etc. The oxidation product obtained can be esterified as such and the resulting product can be employed as plasticizers, etc. In the event the product is desired in greater purity or as individual oxygenated compounds, fractionation of the oxidation product by various methods can be employed, for example, extraction with hot water, distillation, etc. If desired the oxidized product can be subjected to further chemical treatment, for example, subjected to nitric acid oxidation with subsequent recovery of dibasic acids, in the manner set forth in U.S. Patent No. 2,771,482 to G. P. Brown, Jr., et al.

The process of this invention can further be understood by reference to the following examples. In each of the three examples the hydrocarbon being oxidized is a paraffin wax having a melting point of 52° C. Also employed in each example in order to reduce the induction period is a selected amount of an air oxidized hydrocarbon obtained by passing through 200 grams of paraffin wax having a melting point of 52° C., 8 cubic feet of air per hour at atmospheric pressure and a temperature of 160° C. for 7 hours. An oxidation product having a saponification number of 233 was obtained.

The processes in Examples I and II were not run in accordance with the present invention and illustrate the disadvantages thereof.

Example I

Into a flask equipped with a stirrer was placed a mixture containing 200 grams of paraffin wax having a melting point of 57° C., 2 grams of manganese naphthenate, and in order to cut down on induction period, 4 grams of air-oxidized wax having a saponification number of 233 obtained in the manner described immediately above. After heating the mixture to a temperature of 130° C., air at a rate of 3.5 cubic feet per hour was passed through the molten mass while the same was stirred at the rate of 8000 to 10,000 revolutions per minute. During the reaction the temperature was maintained at 130° C. and the pressure atmospheric. The reaction was permitted to proceed for 4 hours. During the reaction excessive foaming occurred. At the end of the reaction period 200 grams of an air-oxidized mixture having a saponification number of 31 was obtained. During the course of the reaction 0.44 gram of oxygen per gram of wax was made available. The oxygen utilization factor, obtained by dividing the saponification number by the amount of oxygen available per gram of wax, is therefore 70.

Example II

This run is identical to that of Example I except that the reaction period was lengthened to 8 hours. Excessive foaming, as before, occurred during the reaction period. At the end of the reaction period 200 grams of an air oxidized mixture having a saponification number of 80 was obtained. During the course of the reaction 0.90 gram of oxygen per gram of wax was made available. The oxygen utilization factor is therefore 89.

It will be noted that while the saponification number in Example II was somewhat higher than in Example I, this is due to a longer reaction period, for the utilization factor in each example was somewhat similar. This is to be contrasted with the process described below in Example III, which was run in accordance with a preferred embodiment of the present invention.

Example III

This run was identical to that of the two previous runs but with two exceptions: the reaction period was extended to 14½ hours and 0.05 gram of Dow Corning Anti-Foam A (a polydimethylsiloxane) having the following structural formula:

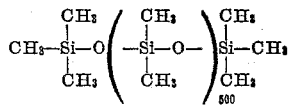

was incorporated in the mixture prior to oxidation. No foaming occurred during the reaction period. At the end of the reaction period 200 grams of an air-oxidized mixture having a saponification number of 298 was obtained. During the course of the reaction 1.9 grams of oxygen per gram of wax were available. The oxygen utilization factor is therefore 157.

The advantages to be derived by operating in accordance with our invention are apparent from the above. The oxygen utilization factor, which is a measure of oxygen available which is utilized during the oxidation reaction, amounted to 70 and 89 in Examples I and II, respectively. By incorporating only a small amount of a silicone in the charge mixture in Example III, the oxygen utilization factor was greatly increased to 157.

Obviously many modifications and variations of the invention, as hereinabove set forth, can be made without departing from the spirit and scope thereof, and therefore only such limitations should be imposed as are indicated in the appended claims.

We claim:

1. In a process for oxidizing a paraffin wax having 20 to 40 carbon atoms, the improvement which comprises incorporating in said paraffin wax, prior to oxidization, at least about 0.01 percent by weight of a silicone having the following structural formula:

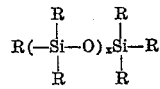

wherein R is selected from the group consisting of an alkyl group and an aromatic group, and $x$ is an integer of about 100 to 1000, whereby an oxidized product having a high saponification number is obtained.

2. In a process for oxidizing a paraffin wax having 20 to 40 carbon atoms, the improvement which comprises incorporating in said paraffin wax, prior to oxidation, a selected amount of a polydimethylsiloxane, whereby an oxidized product having a high saponification number is obtained.

3. In a process for oxidizing a paraffin wax having 20 to 40 carbon atoms with a gas containing oxygen, the improvement which comprises incorporating in said paraffin wax, prior to oxidation, at least about 0.01 percent by weight of a silicone having the following structural formula:

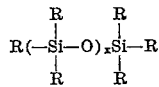

wherein R is selected from the group consisting of an alkyl group and an aromatic group, and $x$ is an integer of about 100 to 1000, whereby an oxidized product having a high saponification number is obtained.

4. In a process for oxidizing a paraffin wax having 20 to 40 carbon atoms with a gas containing oxygen, the improvement which comprises incorporating in said paraffin wax, prior to oxidation, a selected amount of a polydimethylsiloxane, whereby an oxidized product having a high saponification number is obtained.

5. In a process for oxidizing a paraffin wax having 20 to 40 carbon atoms with a gas containing oxygen at a temperature of about 130° to about 200° C., the improvement which comprises incorporating in said paraffin wax, prior to oxidation, at least about 0.01 percent by weight of a silicone having the following structural formula:

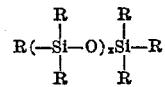

wherein R is selected from the group consisting of an alkyl group and an aromatic group, and $x$ is an integer of about 100 to 1000, whereby an oxidized product having a high saponification number is obtained.

6. In a process for oxidizing a paraffin wax having 20 to 40 carbon atoms with a gas containing oxygen at a temperature of about 130° to about 200° C., the improvement which comprises incorporating in said paraffin wax, prior to oxidation, a selected amount of a polydimethylsiloxane, whereby an oxidized product having a high saponification number is obtained.

7. In a process for oxidizing a paraffin wax having 20 to 40 carbon atoms with a gas containing oxygen at a temperature of about 130° to about 200° C., the improvement which comprises incorporating in said paraffin wax, prior to oxidation, at least about 0.01 percent by weight of a silicone having the following structural formula:

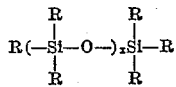

wherein R is selected from the group consisting of an alkyl group and an aromatic group, and $x$ is an integer of about 100 to 1000, and an oxidation catalyst, whereby an oxidized product having a high saponification number is obtained.

8. In a process for oxidizing a paraffin wax having 20 to 40 carbon atoms with a gas containing oxygen at a temperature of about 130° to about 200° C., the improvement which comprises incorporating in said paraffin wax, prior to oxidation, a selected amount of polydimethylsiloxane and an oxidation catalyst, whereby an oxidized product having a high saponification number is obtained.

9. In a process for oxidizing a paraffin wax having 20 to 40 carbon atoms with a gas containing oxygen at a temperature of about 130° to about 200° C., the improvement which comprises incorporating in said paraffin wax, prior to oxidation, at least about 0.01 percent by weight of a silicone having the following structural formula:

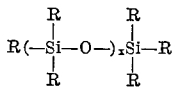

wherein R is selected from the group consisting of an alkyl group and an aromatic group, and $x$ is an integer of about 100 to 1000, an oxidation catalyst and an air-oxidized hydrocarbon, whereby an oxidized product having a high saponification number is obtained.

10. In a process for oxidizing a paraffin wax having 20 to 40 carbon atoms with a gas containing oxygen at a temperature of about 130° to about 200° C., the improvement which comprises incorporating in said paraffin wax, prior to oxidation, a selected amount of a polydimethylsiloxane, an oxidation catalyst and an air-oxidized hydrocarbon, whereby an oxidized product having a high saponification number is obtained.

References Cited in the file of this patent

UNITED STATES PATENTS

| | | |
|---|---|---|
| 2,653,909 | Frazier | Sept. 29, 1953 |
| 2,681,357 | McKinley | June 15, 1954 |
| 2,726,255 | Walker et al. | Dec. 6, 1955 |

UNITED STATES PATENT OFFICE

CERTIFICATION OF CORRECTION

Patent No. 2,960,519 November 15, 1960

Ronald L. Marr et al.

It is hereby certified that error appears in the above numbered patent requiring correction and that the said Letters Patent should read as corrected below.

Column 2, line 43, for "gultaric" read -- glutaric --; column 4, lines 13 and 14, 34, 56, column 5, line 5, and column 6, line 9, for "a selected amount", each occurrence, read -- at least about 0.01 percent by weight --; column 5, line 8, for "haxing" read -- having --.

Signed and sealed this 9th day of May 1961.

(SEAL)
Attest:

ERNEST W. SWIDER
Attesting Officer

DAVID L. LADD
Commissioner of Patents